2,470,249

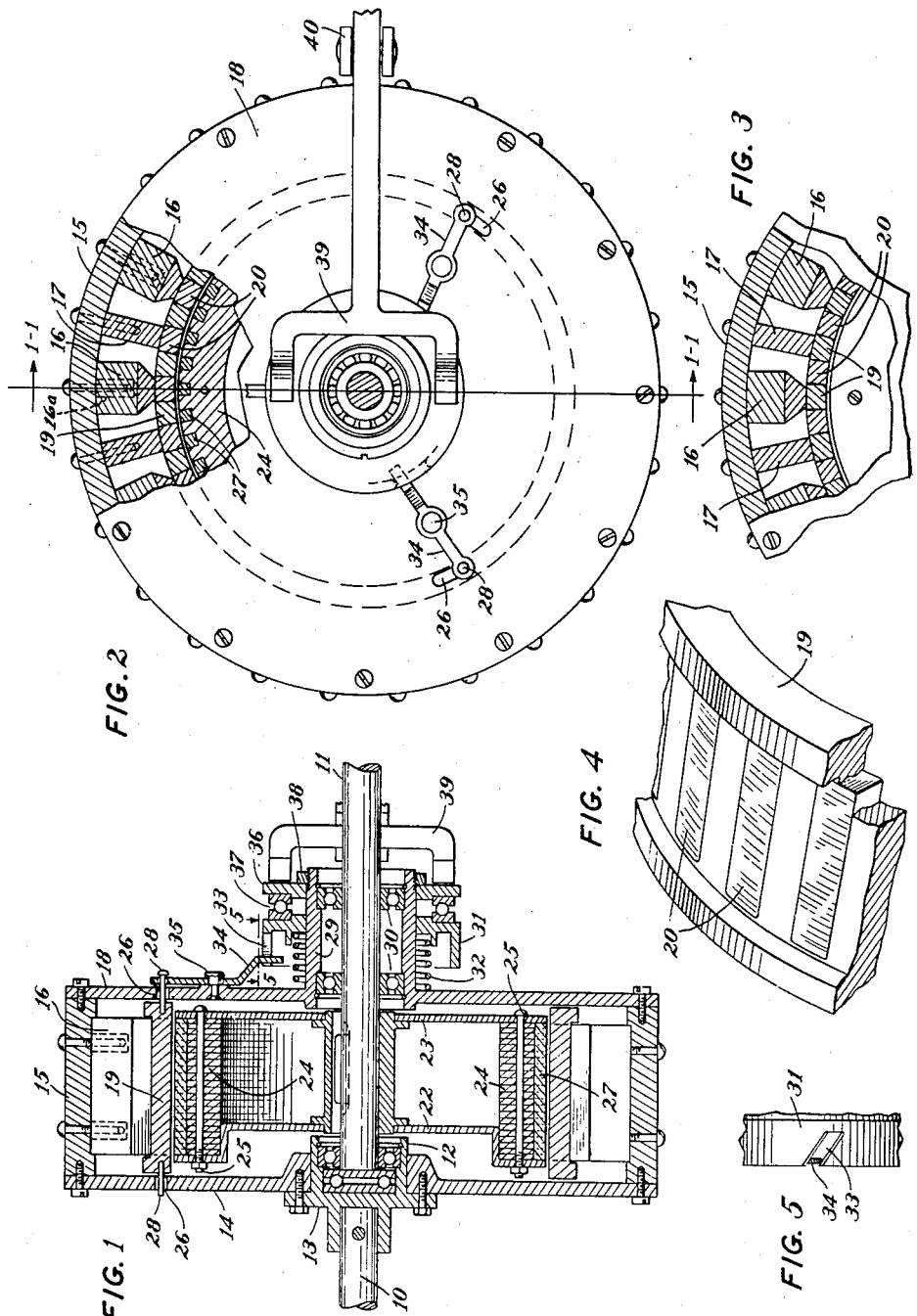
May 17, 1949.  S. KARASICK  2,470,249
PERMANENT MAGNET FIELD COUPLING
Original Filed Sept. 6, 1940
INVENTOR
SAMUEL KARASICK
BY
D. Clyde Jones
ATTORNEY Patented May 17, 1949

UNITED STATES PATENT OFFICE 2,470,249

PERMANENT MAGNET FIELD COUPLING

Samuel Karasick, Great Barrington, Mass.; Mary K. Karasick executrix of Samuel Karasick, deceased Original application September 6, 1940, Serial No. 355,663, now Patent No. 2,376,150, dated May 15, 1945. Divided and this application April 27, 1945, Serial No. 590,707

9 Claims. (Cl. 172—284)

This invention relates to holding devices of the magnetic type and to magnetic coupling units. This application is a division of applicant's application, Serial No. 355,663, filed September 6, 1940 now Patent No. 2,376,150.

The main feature of the present invention relates to a magnetic holding device having interposed between a permanent magnet and a support thereof, a flux conducting part movable to alternate positions to open and close the magnetic circuit between the magnet and the support.

The present invention is especially applicable to a magnetic coupling arrangement, in which the flux-producing member or field is arranged to rotate around a structure which is similar to the rotor of an induction motor, of the squirrel cage type. This rotor may be of the common or of the double-decked type, depending on the torque characteristics desired of the coupling unit. The distinguishing feature of this coupling unit, as compared to those already well-known in the art, comprises the use of permanent magnets as flux-producing members, instead of electromagnets, together with a flux-control circuit. In this arrangement, the reluctance of the path between a pole-piece and a magnet pole is increased by introducing an air gap therein, after which the pole-piece is caused to approach a pole of an opposite sign, whereby the fluxes from the two poles crossing the air gap to the pole-piece, effect a state of magnetic neutralization therein. This is accomplished by shifting the member carrying the pole-pieces rotationally with respect to the flux-producing members, which shifting action is caused by any suitable means. This coupling unit obviates the necessity of a direct current source or exciter of considerable capacity, formerly required.

In the drawings, Fig. 1 is a vertical section through a magnetic coupling unit made in accordance with the present invention taken substantially on the line 1—1 of Fig. 2; Fig. 2 is an end view of the magnetic coupling unit shown in Fig. 1, a portion of the coupling being broken away for clearness in illustration; Figs. 3, 4 and 5 are detailed views illustrating various parts of the construction of this device.

Referring especially to Fig. 1, the holding or coupling unit comprises two shafts 10 and 11 arranged in alinement, with their adjacent ends fitted into a so-called spigot bearing 12. For convenience the shaft 10 is referred to as the driven member and the shaft 11 as the driving member, although it will be understood that either of these shafts may be the driving shaft and the remaining shaft will then be the driven shaft. The driven shaft 10 is fixed to the bearing 12. This bearing is provided with a radially extending peripheral flange 13 to which there is secured the center portion of a circular disc 14 having its principal plane extending at right angles to the shaft 10. The other margin of this disc has fastened thereto and extending at right angles therefrom, a ring of ferromagnetic material 15. This ring defines a cylindrical casing surrounding one end of the driving shaft 11. On the inner surface of this ring, there is secured in radial arrangement, a magnetic assembly including spaced permanent magnets 16 of "Alnico," and spaced return yokes 17 of soft iron or the like. To facilitate mounting of the magnets, they are cast with threaded steel bushings 16a therein to receive threaded screws passing through the ring 15. The cross section of these permanent magnets is best illustrated in Figs. 2 and 3. It will be understood that the dimensions of the permanent magnets and yokes as well as the spacing thereof bear the same relation to each other as the corresponding magnets and yokes in the chuck illustrated in Figs. 9 to 13 inclusive of application 355,663, now Patent No. 2,376,150, previously referred to. In fact, the magnetic assembly of the present coupling unit may be considered as analogous to the magnetic assembly of that application, if this assembly is made into cylindrical form with the bottom plate on the outside of the unit and the free ends of the magnets and yokes extending toward a common center. A circular disk 18, thru the center of which the driving shaft 11 passes, is secured to the free edge of the ring 15 to provide a closure therefor.

An annular member 19 preferably made of non-magnetic material and best shown in Fig. 4 corresponds to the top plate of the chuck illustrated in Figs. 9 to 13 inclusive of the mentioned application. This annular member insulatedly supports laminated soft iron pole-pieces 20, the pole-pieces being equal in length and width to the corresponding dimensions of the inner surfaces of the magnets 16 and return yokes 17. The spacing between the pole-pieces is equal to the spacing between the magnets and return yokes. The outer surface of the annular member as well as the inner surfaces of the magnets and pole-pieces are accurately ground to a smooth surface so that there is a very small air gap between these surfaces. The annular member is provided at each of its edges with a plurality of pins 28 which function to rotate the member in a manner to be set forth.

The driving shaft 11 has secured thereto on the portion thereof within the cylindrical ring, two circular spiders 22 and 23 in spaced relation. The margins of these spiders which terminate at the inner surface of the annular member have circular laminations of steel 24 secured thereto by suitable bolts 25. The outer cylindrical surface of these laminations which have been turned down after assembly to provide a smooth surfaced cylinder, is in close relation to the inner surface of the member 19, so that there is a very small air gap between these parts. The outer surface of the circular laminations are provided with transverse slots within which there are placed copper bars 27 or conducting material termed low resistance windings having a length equal to that of the pole-pieces. Thus the circular laminations with the transverse bars mounted therein provide a rotor construction similar to that of a squirrel cage rotor of the well known type. However, the present construction permits the air gap between the driving and the driven part of the coupling to be narrower than is customary in induction motors or in conventional magnetic coupling units.

The circular discs 14 and 18 are each provided in their outer margins with a plurality of arcuate slots 26 curved about the axis of the driving shaft through which slots there project the pins 28 extending from the edges of the member 19. The disc 18 is provided at its center portion with an outwardly extending sleeve 29 surrounding the driving shaft 11. This sleeve has mounted therein suitable spaced bearings 30 within which the driving shaft rotates. The sleeve extends through and supports a collar 31 which is normally spaced from the disc 18 by a coiled spring 32 surrounding the sleeve. The collar is provided with cam slots 33 inclined with respect to the surface of the disc 18. Each of these cam slots receives the free end of an arm 34 pivoted at its intermediate point 35 on the spider 18, the other end of the arm being connected to one of the pins 28 mounted on the annular member 19. A second collar 36 surrounding the sleeve is mounted in spaced relation to the first collar 31 with a suitable bearing 37 therebetween. A nut 38 engaging the free end of the sleeve 29 retains these collars and the interposed bearing in the relation shown. The two collars and their interposed bearing may be shifted along the axis of the driving shaft 11 against the action of the coil spring 32 by means of a bifurcated lever 39 pivoted on a fixed part 40 independent of the coupling unit. It will be understood that when the forked end of the lever is advanced toward the left in Fig. 1 to move the collars 31 and 36 against the compression of the coil spring, the arms 34 under the influence of cams 33 will rotate the annular member 19 with respect to the magnetic assembly. When the annular member 19 is rotated in this manner, no flux issues from the inner surface thereof. However, when the bifurcated lever 39 is released, the spring 32 moves the collars to the right (Fig. 1) and the cam slots 33 in the collar 31 cooperate with the arms 34 to rotate the annular member 19 in the reverse direction with respect to the magnetic assembly so that the full flux is produced therethrough. It will be understood that in positions intermediate of these extreme positions, partial flux will result.

It will be noted that the mass of the coupling unit constitutes a mass of sufficient rotational inertia to function as a motor fly wheel. If it is assumed that the bifurcated lever 39 is actuated by a conventional clutch pedal, when the operator applies force to the collars 31 and 36 by means of this pedal there will be no flux at the inner surface of the annular member 19 so that the transmission gears (not shown) may be set as desired. It will be understood that these gears are disposed on the shaft 11 in the well known manner, as shaft 11 is the clutch shaft. Reference should be made to page 8, Figure 3 of Dyke's Manual, 18th edition, in which the arrangement of flywheel, clutch and transmission gears are shown. It will be understood that shaft 11 corresponds to the shaft between clutch and transmission in that figure. The operator may now speed up his motor either manually or under governor control until the speed of maximum torque results. However, no reaction occurs on the driven shaft 11 until the annular member 19 is properly positioned with respect to the rotating magnetic assembly which is effected by releasing the pressure on the collars 31 and 36. The flux increases gradually as the collars 31 and 36 move back to their normal position, that is, the position in which they are held by the coil spring 32. The rotating field from the rotating magnet assembly produces a torque on the inner member by virtue of its squirrel cage construction. In order to secure maximum utility the squirrel cage unit should preferably be of the double squirrel type to produce maximum torque or at least full torque at a slip equal to the speed of maximum torque of the motor. This unit specifically may be of the construction shown in the right-hand view, Fig. 4.14, page 112 of Electric Motors Industry, by Shoults, Rife and Johnson, published by John Wiley and Sons, copyrighted 1942 by General Electric Company. Fig. 4.9, page 108 of this reference further discloses the construction of a squirrel cage unit. The vehicle in which the coupling unit is used will accelerate with the motor at maximum torque until the slip speed between the coupling members is such that the torque is just sufficient to overcome resistance to motion.

As contrasted with the conventional friction clutch, this clutch can slip and yet transmit torque without destruction of any friction surfaces. The energy released in the coupling while slipping appears in heat in the squirrel cage unit, and means may be provided if necessary to cool the unit such as by forming fan blades on the spiders 22 and 23, to blow air through the driven member.

As contrasted to the nearest analogous device, the so-called Daimler fluid flywheel, which is a hydraulic analogue of a squirrel cage motor, this device combines within itself both clutch and slipping coupling functions, whereas the fluid flywheel requires a conventional friction clutch. As compared to an electromagnetic coupling, the present device obviates the complications of an adequate source of direct current field supply and the necessary slip rings therefor.

What I claim is:

1. In a magnetic device, a circular unit containing spaced flux-carrying members radially arranged therein, a second circular unit provided with flux producing members, each member comprising a permanent magnet and a spaced part of soft ferrous material joined thereto to constitute opposite poles, the poles of said members being radially arranged in a pattern like that of the flux-carrying members, and means for relatively moving said units to bring said flux-producing members into contact with said flux-carrying members to develop a holding condition and being movable to a position out of contact therewith to introduce a high reluctance gap between said flux-producing members and flux-carrying members.

2. In a magnetic device, a circular unit containing spaced flux-carrying members radially arranged therein, a second circular unit provided with flux producing members, each member comprising a relatively thick Alnico magnet terminating at one end in a relatively narrow soft iron tip and a spaced narrow part of soft iron material magnetically joined to the other end of the magnet, the narrow end of the magnet and the free end of said soft iron part constituting opposite poles, the poles of said members being radially arranged in a pattern like that of the flux-carrying members, and means for relatively moving said units to bring said flux-producing members into contact with said flux-carrying members to develop a holding condition and being movable to a position out of contact therewith to introduce a high reluctance gap between said flux-producing members and said flux-carrying members.

3. In a magnetic device, a support comprising ferrous strip-like parts alternating with non-ferrous strip-like parts, a first unit parallel to said support and comprising permanent magnets having poles arranged according to the pattern of said ferrous parts and spaced apart a distance approximately equal to the width of the non-ferrous parts, and a second unit made of non-magnetic material having flux-carrying members arranged therein according to approximately the same pattern and the same spacing as said poles, said second unit interposed between said support and said first unit and having its members engaging the adjacent surfaces of the support and the first unit, said second unit being movable to bring its members into and out of registry with said poles.

4. In a magnetic device, a circular support comprising ferrous strip-like parts alternating with non-ferrous strip-like parts, said parts being radially arranged in said support, a circular first unit in spaced parallel relation to said support and comprising permanent magnets having poles radially arranged according to the pattern of said ferrous parts and spaced apart a distance approximately equal to the width of the non-ferrous parts, and a circular second unit interposed between said support and said first unit, said second unit being made of non-magnetic material having flux-carrying members radially arranged therein according to approximately the same pattern and the same spacing as said poles, said second unit having its members engaging the adjacent surfaces of the support and the first unit, said second unit being rotatable to bring its members into and out of registry with said poles.

5. In a magnetic coupling device, a pair of shafts in coaxial alinement, one of said shafts being a driving shaft and the other a driven shaft, a generally cylindrical hollow magnetic assembly mounted in coaxial relation on one of said shafts, said magnetic assembly comprising a ring of ferromagnetic material having permanent magnets and return yokes mounted in spaced relation thereon to project toward the common axis of said shafts, an annular member within said magnetic assembly and shiftable with respect to said magnetic assembly about said axis, said member having polepieces insulatedly mounted in spaced relation therein, the spacing between said polepieces being equal to the spacing between said permanent magnets and yokes whereby said polepieces may be shifted into operative relation to the spaces therebetween, a rotor within said annular member secured on said other shaft in coaxial relation therewith, strips of conducting material lying in slots on the periphery of said rotor, the number of such strips being substantially larger than the number of poles and having their ends at either face of the rotor connected by annular rings of electrically conducting material of low specific electrical resistance.

6. In a magnetic coupling device, a pair of shafts in coaxial alinement, one of said shafts being a driving shaft and the other a driven shaft, a generally cylindrical hollow magnetic assembly mounted in coaxial relation on one of said shafts, said magnetic assembly comprising a ring of ferromagnetic material having permanent magnets and return yokes mounted in spaced relation thereon to project toward the common axis of said shafts, an annular member within said magnetic assembly and shiftable with respect to said magnetic assembly about said axis, said member having polepieces insulatedly mounted in spaced relation therein, the spacing between said polepieces being equal to the spacing between said permanent magnets and yokes whereby said polepieces may be shifted into operative relation to the spaces therebetween, a rotor within said annular member secured on said other shaft in coaxial relation therewith, windings on said rotor adapted to produce a torque tending to turn said rotor in the same direction as the rotation of the cylindrical hollow magnetic assembly when said assembly and said rotor are revolving with the rotational speed of the assembly greater than that of the rotor.

7. In a magnetic coupling device, a pair of shafts in coaxial alinement, one of said shafts being a driving shaft and the other a driven shaft, a generally cylindrical hollow magnetic assembly mounted in coaxial relation on one of said shafts, said magnetic assembly comprising a ring of ferromagnetic material having permanent magnets and return yokes mounted in spaced relation thereon to project toward the common axis of said shafts, an annular member within said magnetic assembly and shiftable with respect to said magnetic assembly about said axis, said member having polepieces insulatedly mounted in spaced relation therein, the spacing between said polepieces being equal to the spacing between said permanent magnets and yokes whereby said polepieces may be shifted into operative relation to the spaces therebetween, a rotor within said annular member secured on said other shaft in coaxial relation therewith, and tending to turn said rotor in the opposite direction to the rotation of the assembly whenever the rotational speed of the rotor is greater than that of the assembly and in the same direction.

8. In a magnetic coupling device, a pair of shafts in coaxial alinement, one of said shafts being a driving shaft and the other a driven shaft, a generally cylindrical hollow magnetic assembly mounted in coaxial relation on one of said shafts, said magnetic assembly comprising a ring of ferromagnetic material having permanent magnets and return yokes mounted in spaced relation thereon to project toward the common axis of said shafts, an annular member within said magnetic assembly and shiftable with respect to said magnetic assembly about said axis, said member having polepieces insulatedly mounted in spaced relation therein, the spacing between said polepieces being equal to the spacing between said permanent magnets and yokes whereby said polepieces may be shifted into operative relation to the spaces therebetween, a rotor within said annular member secured on said other shaft in coaxial relation therewith, slots in the cylindrical surface of the periphery of said rotor, pairs of electrical conductors lying radially above each other in said slots, the ends of each outer conductor being connected to an annular ring of electrically conducting material, and the ends of each inner conductor being connected to a second ring of electrical conducting material, the outer set of conductors and rings being of higher electrical resistance than the inner set.

9. The method of engaging a magnetic coupling employing permanent magnets in which the effective air gap between the permanent magnets and the electromagnetically driven member is decreased by moving circumferentially relative to said magnets, an annular member composed of non-magnetic material and containing ferromagnetic elements adapted to engage the poles of said permanent magnets.

SAMUEL KARASICK.

REFERENCES CITED

The following references are of record in the file of this patent:

UNITED STATES PATENTS

| Number | Name | Date |
|---|---|---|
| 591,395 | Fay | Oct. 12, 1897 |
| 669,575 | Bliss | Mar. 12, 1901 |
| 819,933 | Schneider | May 8, 1906 |
| 1,259,861 | Henry | Mar. 19, 1918 |

FOREIGN PATENTS

| Number | Country | Date |
|---|---|---|
| 272,299 | Great Britain | June 13, 1927 |
| 409,821 | Great Britain | May 10, 1934 |
| 391,794 | France | Nov. 9, 1908 |
| 434,005 | Germany | Sept. 20, 1926 |